(12) United States Patent
Hanten et al.

(10) Patent No.: US 6,217,436 B1
(45) Date of Patent: Apr. 17, 2001

(54) METHOD AND CLOSING DEVICE FOR PRODUCING SAUSAGE-LIKE PRODUCTS

(75) Inventors: Jürgen Hanten, Rockenberg; Günter Vermehren, Usingen, both of (DE)

(73) Assignee: Poly-Clip System GmbH & Co. KG, Frankfurt am Main (DE)

( * ) Notice: Subject to any disclaimer, the term of this patent is extended or adjusted under 35 U.S.C. 154(b) by 0 days.

(21) Appl. No.: 09/297,209

(22) PCT Filed: Oct. 14, 1997

(86) PCT No.: PCT/EP97/05647

§ 371 Date: Jun. 1, 1999

§ 102(e) Date: Jun. 1, 1999

(87) PCT Pub. No.: WO98/18334

PCT Pub. Date: May 7, 1998

(30) Foreign Application Priority Data

Oct. 31, 1996 (DE) ............................... 196 44 074

(51) Int. Cl.[7] .................................................. A22C 11/00
(52) U.S. Cl. ................................. 452/46; 452/48
(58) Field of Search .................. 452/48, 46, 47

(56) References Cited

U.S. PATENT DOCUMENTS

| | | |
|---|---|---|
| 4,044,425 * | 8/1977 | Nausedas ................... 452/48 |
| 4,218,861 | 8/1980 | Marz . |
| 4,438,545 * | 3/1984 | Kupcikevicius et al. .............. 452/48 |
| 4,709,450 | 12/1987 | Stanley et al. . |
| 4,796,332 * | 1/1989 | Stanley .................... 452/48 |
| 4,847,951 * | 7/1989 | Kollross .................... 452/48 |
| 5,087,463 * | 2/1992 | Raudys et al. ................ 452/48 |
| 5,405,288 | 4/1995 | Stanley . |

FOREIGN PATENT DOCUMENTS

| | | |
|---|---|---|
| 2730603 | 1/1979 | (DE) . |
| 196 01 720 | 8/1996 | (DE) . |
| 0000821 | 2/1979 | (EP) . |
| 2109219 | 6/1983 | (GB) . |

* cited by examiner

*Primary Examiner*—Willis Little
(74) *Attorney, Agent, or Firm*—Norris McLaughlin & Marcus

(57) ABSTRACT

Method and closing device for producing sausage-like products with a flexible tubular or pouch-like wrapper, wherein the various stages of the closing process include constriction of the wrapper, elongation of the braid, setting and closure of the clamp fastener, which can be controlled in a partially autonomous manner by means of a programmable control unit.

9 Claims, 4 Drawing Sheets

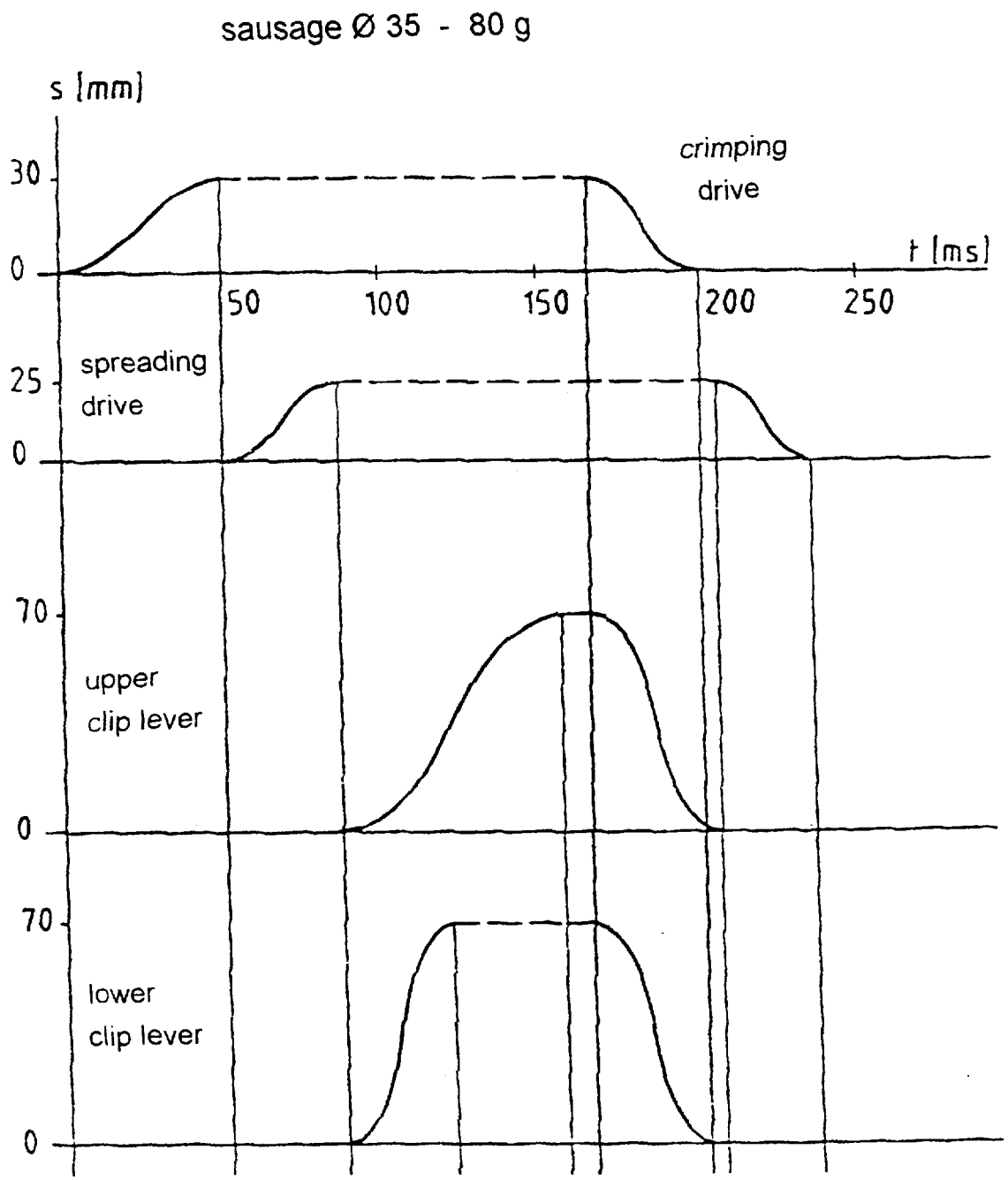

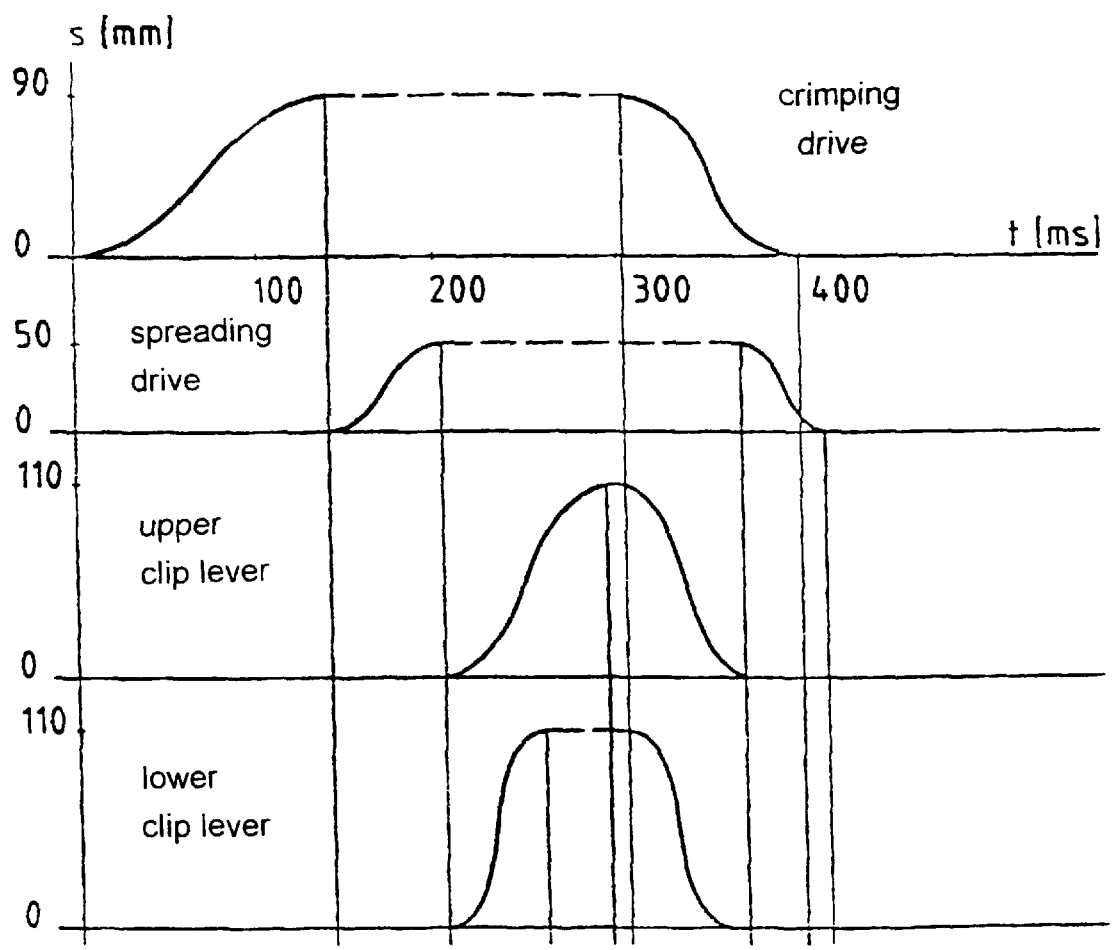

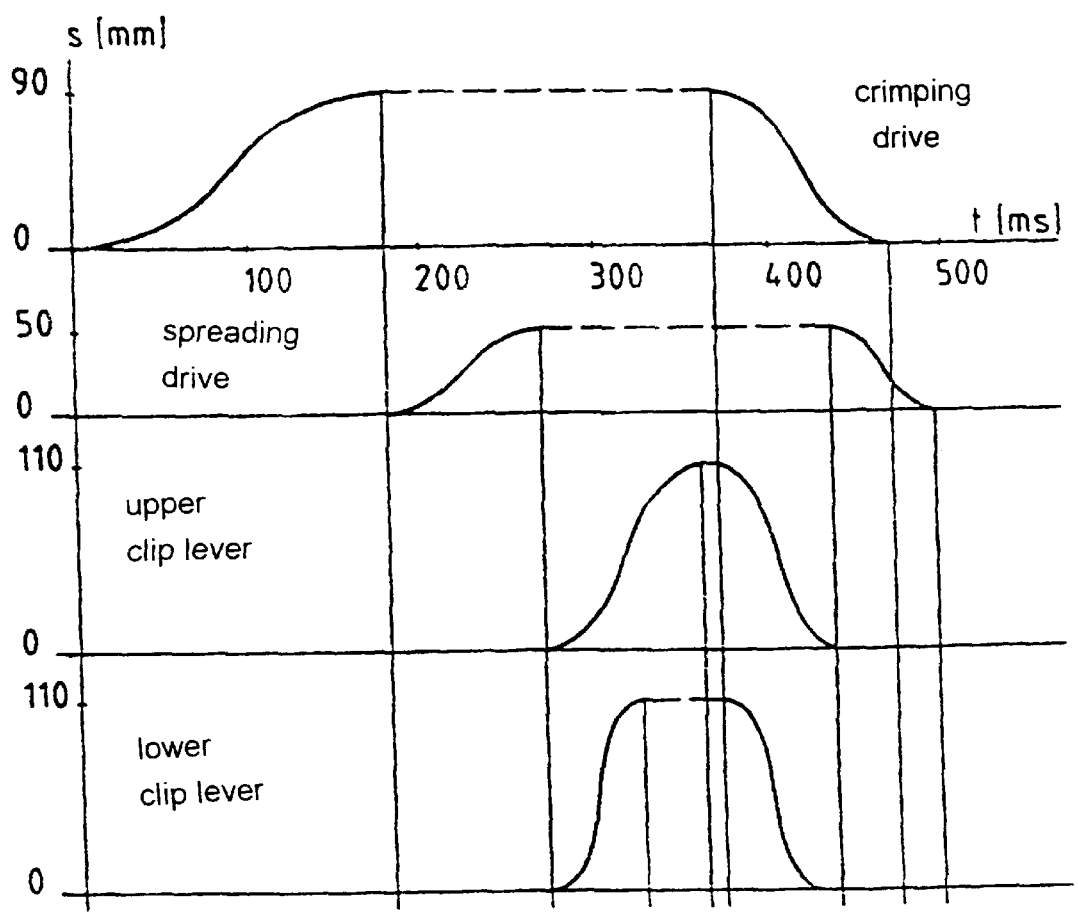

METHOD AND CLOSING DEVICE FOR PRODUCING SAUSAGE-LIKE PRODUCTS

This invention relates to a method for producing sausage-like products with a tubular or bag-shaped packaging casing, where the (unilaterally closed) packaging casing is first of all filled with filling and is subsequently crimped, then there is produced a neck portion of the desired length, which is free from filling, and the neck portion free from filling is finally closed by setting and closing at least one closure clip. The invention also relates to a closing device for producing sausage-like products with a tubular or bag-shaped packaging casing comprising means for crimping the packaging casing, means for producing a neck portion free from filling by spreading the crimping means, and means for setting and closing closure clips.

It is known to package for instance sausage meat for edible sausages or cement and sealing compounds in tubular films or bags. This is done in a known manner (DE-OS 27 30 603) in that the tubular or bag-shaped packaging casing is filled with filling by a filling machine. At the end of the filling operation or shortly before the same, the filling machine emits a pulse by means of which a closing operation is initiated. The same starts with the filled packaging casing being first of all crimped to form a short neck by closing two pairs of crimping shears. Subsequently, the two pairs of crimping shears are axially moved apart (spread) in longitudinal direction of the sausage (and displace filling which is present at this point), so that between the two pairs of crimping shears there is obtained a neck of the desired length, which is free from filling. Thereupon, a lower clip lever with a die in which two open closure clips are disposed swivels below the neck portion free from filling, whereas at the same time an upper clip lever with a stamp swivels towards the closure clips from the top and closes the same. The neck has then been closed by two closure clips disposed one beside the other and can possibly be cut through between these two closure clips. After the closing operation the machine parts involved therein move back to their starting position, and a new working cycle starts with the filling operation.

The pairs of crimping shears and the clip lever are mechanically coupled with each other, e.g. by shafts, cam plates or the like, so that their movements are forcibly coordinated during the closing operation.

Proceeding from this prior art it is the object underlying the invention to increase the productivity during the production of sausage-like products with tubular or bag-shaped packaging casing.

In accordance with the invention, the solution of this object consists in a method as described above, where the partial operations of closing including crimping the packaging casing, of elongating the neck obtained as well as of setting and closing the closure clip can at least partly be controlled independent of each other.

The gist of the invention consists in omitting the rigid forced coordination of the movements when closing the packaging casing in favor of a flexible control or regulation of the individual movements adapted to the respective product. It is thus possible to ensure that the spreading operation e.g. in the case of raw sausages or sealing compound and cement sausages takes place more slowly and in a controlled way, whereas the setting and closing of the closure clips takes place much quicker than has so far been common practice. In this way, the productivity during the production of such products is increased considerably.

An advantageous variant of the method is characterized in that the partial operations of closing are controlled by product-specific programs. In this way, the movements of the machine parts involved in the closing operation can be stored in a program for each product, so that these movements can easily be recalled for the production of the respective product. The product-specific properties, on which depend the movements stored in the program, are for instance the kind of filling and the kind of packaging casing material, the final diameter and the final weight of the finished product, and the kind of closure clips used.

In accordance with the invention, the solution of the object furthermore consists in a device as stated above, where the means for crimping the packaging casing, the means for elongating the neck, and the means for setting and closing closure clips can at least partly be controlled independent of each other. The device originates from the same basic idea as the method mentioned above and can accordingly be used for performing this method. The device thus creates the conditions for a considerable increase in productivity during the production of sausage-like products. The means for crimping the packaging casing and for forming a neck portion free from filling by spreading the crimping means, which are provided in the device, can be the known pairs of spreadable crimping shears. Suitable means for setting and closing closure clips are the known clip levers provided with stamp and die.

The device preferably includes a control unit with which the means for crimping the packaging casing, the means for elongating the neck obtained (by spreading the crimping means), and the means for setting and closing the closure clips are connected for a variably coordinated actuation.

The control unit is preferably programmable such that it can be fed with product-specific programs in which the optimum movements for the respective product are stored. In this way, the device can easily be adapted to the respective product to be produced without conversions, by a simple change of program.

In a preferred embodiment of the device, the means for crimping the packaging casing, the means for elongating the neck, and the means for setting and closing closure clips have electric motors as controllable driving elements. Particularly suitable electric motors are linear motors or synchronous motors. By using electric motors as driving elements, the entire control of the closing operation can be effected electrically or electronically.

An alternative embodiment of the method is characterized in that the means for crimping the packaging casing, the means for elongating the neck, and the means for setting and closing closure clips have hydraulic elements as controllable driving elements. A common advantage of hydraulic elements and of the aforementioned electric motors is the fact that their movement can exactly be controlled at any time, so that not only the beginning of the individual movements, but also the respective movement itself can exactly be predetermined.

The invention will now be explained in detail with reference to three examples by means of the figures of the drawing, wherein:

FIG. 2 shows a movement diagram optimized for a certain type of product for the crimping drive, the spreading drive, the upper clip lever and the lower clip lever of a closing machine;

FIG. 3 shows the movement diagram from FIG. 2 for another type of product; and

FIG. 4 shows the movement diagram for a third type of product.

Figure 1:
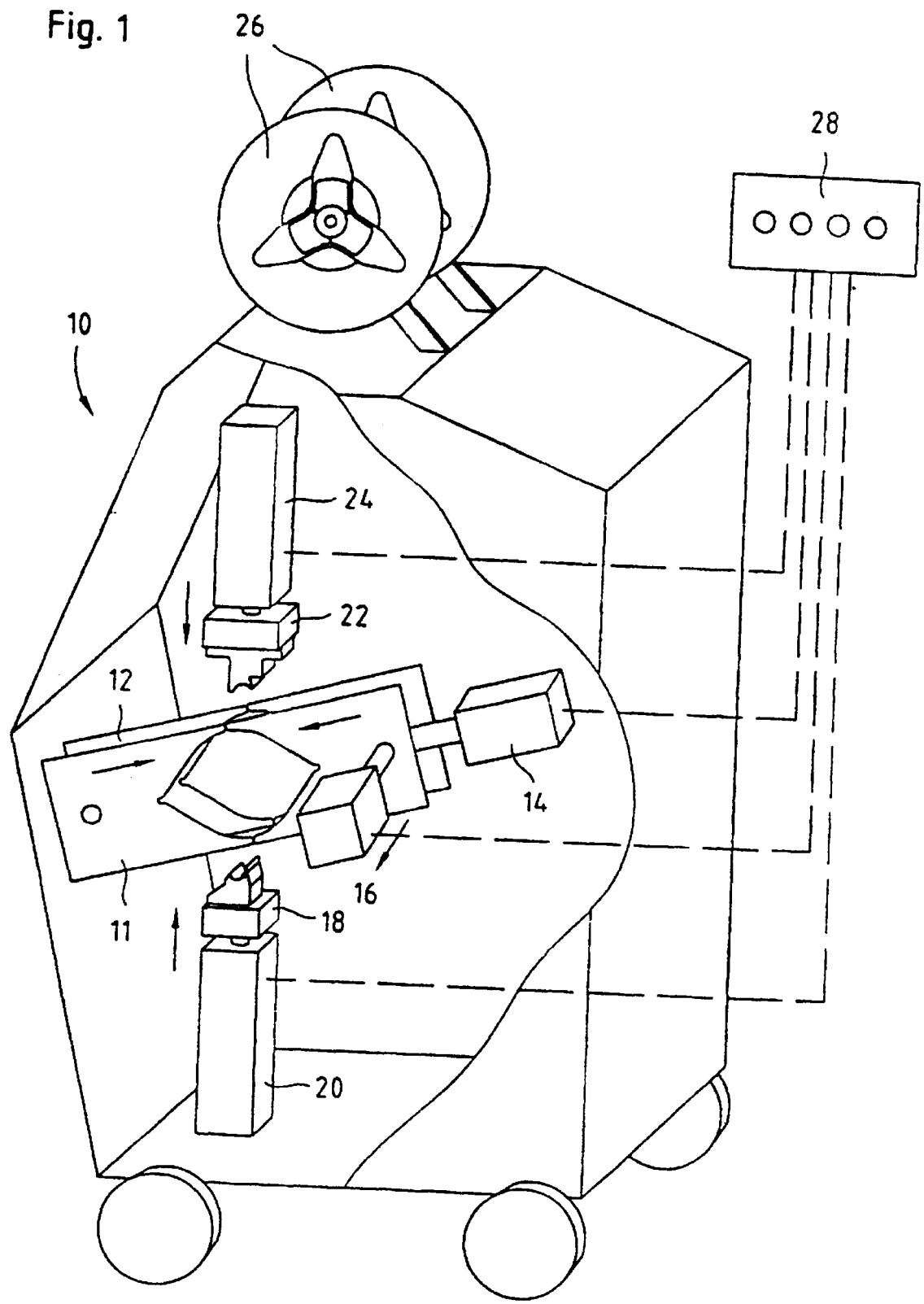
FIG. 1 shows an inventive closing device (including control unit) in a schematic perspective representation.

The diagrams shown in FIGS. 2 to 4 refer to the device shown in FIG. 1 for closing filled, tubular or bag-shaped packaging casings. This device as a whole designated with 10 has two pairs of crimping shears 11, 12, which can be closed and opened by a crimping drive in the form of a crimping cylinder 14, so as to first gather the filled packaging casing to form a neck and then release the same again upon elongating the neck and setting the clip or clips. In addition, the pairs of crimping shears can temporarily be moved away from each other axially in longitudinal direction of the sausage by means of a spreading drive 16, so as to produce a longer neck portion of the desired length, which is free from filling.

Furthermore, the device includes a lower clip tool with a die 18 for accommodating one or more closure clips, which can be moved below the casing neck by a lower closing cylinder 20, and upon closing the closure clips can be moved back again. There is furthermore provided an upper clip tool with a stamp 22, which is actuated by an upper closing cylinder 24 and cooperates with the die 18 of the lower clip tool, in order to close the closure clips. Subsequently, the die 18 and the stamp 22 are moved back to their starting positions. The closure clips are coherently—in a not represented, but known way—withdrawn from magazines in the form of clip coils 26 and (by cutting them off) introduced into the die 18.

The closing device thus includes four driving elements, which effect the above-described closing operation: the crimping cylinder 14 for opening and closing the pairs of crimping shears 11, 12, the spreading drive 16 for spreading the two pairs of crimping shears 11, 12, as well as the upper and the lower closing cylinder 24 and 20, respectively. These drives are not coupled with each other by a common control drive, such as a cam plate, but are subject to the (electric, pneumatic or hydraulic) control by a control unit 28, whose functional connection with the drives is represented in broken lines in FIG. 1.

The closing operation is initiated by a pulse sent by the filling machine to the closing machine at the latest when the packaging casing is filled with the desired quantity of filling. The closing operation starts with the crimping cylinder 14 of the closing machine 10 closing the two pairs of crimping shears 11, 12 according to a preprogrammed movement, so that the packaging casing is crimped to form a—at first short—neck.

Subsequently, the spreading drive 16 starts to work and spreads the two closed pairs of crimping shears 11, 12 by axially moving them away from each other in longitudinal direction of the sausage. There is obtained a neck portion of the desired length, which is free from filling. This movement, too, is program-controlled and depends for instance on the parameters casing friction, tautness of the product, etc.

After producing the neck portion free from filling, the same is closed by means of two closure clips disposed one beside the other. For this purpose, the lower closing cylinder 20 presses the die 18, in which the closure clips are accommodated, below the casing neck, whereas the upper closing cylinder 24 with the stamp 22 at the same time moves towards the closure clips from the top and closes the same. The upper and lower closing cylinders 20, 24 are activated such that stamp 22 and die 18 start to move at the same time. However, the die 18 reaches its maximum stroke before the stamp 22. The die 18 carries the two closure clips so far into the closing area that the neck is disposed inside the still open closure clips. Only after this will the stamp 22 reach its final position and close the two closure clips by forming them around the neck. Thereupon, stamp 22 and die 18 remain in their terminal positions for a predeterminable period, in order to minimize the spring-back of the closed closure clips. The closing movements of the two tools, and thus the program which determines the movement of the upper and the lower closing cylinder 20, 24, depend for instance on the desired smooth running and the deformability of the closure clips used.

Upon closing the two closure clips, the two pairs of crimping shears 11, 12 can be opened again, and the two closing tools 18, 22 can be moved back to their starting position. These movements are not restricted by any product parameters, so that they can be performed with the maximum possible speed. As soon as the pairs of crimping shears 11, 12 are completely open, they can be moved towards each other by the spreading drive 16, where a damped slow-down of the movement prevents the two pairs of crimping shears from striking against each other. After the two pairs of crimping shears 11, 12 as well as the closing tools 18, 22 have returned to their starting positions, the closing operation is terminated.

The individual movements are programmed once and can be recalled again for the production of the same product via a program code.

The diagrams in FIGS. 2 to 4 represent the regulating distances s of the four driving elements involved in the closing operation as a function of time for three different products which differ from each other in their diameter and their mass or the kind of filling. In this way, the dependence of the movements on the diameter and the mass of the finished product or the filling becomes clear.

In the diagrams of FIGS. 2, 3 and 4 the ordinate each shows the regulating distance s for the crimping cylinder 14, the spreading drive 16, the stamp 22, and the die 18. The abscissa is the time axis.

The diagrams in FIG. 2 refer to a sausage casing having a diameter of 35 mm and a weight of 80 g, which sausage casing is filled with boiled sausage meat.

The sausage underlying the diagrams in FIG. 3 is also filled with boiled sausage meat, but this sausage has a diameter of 120 mm and finally a weight of 2.5 kg. The larger diameter and the larger final weight of the product result in larger regulating distances for all four drives and—as the acceleration of the drives is limited—also longer regulating times.

The sausage underlying the diagrams in FIG. 4 has the same diameter and the same final weight as the sausage shown in FIG. 3, but it is not filled with boiled sausage meat, but with raw sausage meat. Since raw sausage meat has a different consistency as compared to boiled sausage meat, the crimping operation and the spreading operation cannot be performed as quickly as with boiled sausage meat. During the crimping operation, the pairs of crimping shears 11, 12 therefore take more time, despite the same regulating distance, for being moved from the opened into the closed position. The same is true for spreading the pairs of crimping shears. Since for the sausages shown in FIGS. 3 and 4 the same closure clips are used, the upper stamp 22 and the lower die 18 follow the same speed profile in both cases. Measured from the beginning of the crimping operation, the movement of the upper and of the lower tool starts in FIG. 4 at a later time as compared to FIG. 3, as the upper and the lower closing cylinder 24 and 20, respectively, are only started when the spreading drive 16 has moved the two pairs of crimping shears 11, 12 into the maximally spread position, which takes longer than in the example of FIG. 3; in addition, the spreading drive 16 is also only started when the two pairs of crimping shears 11, 12 are completely closed towards the end of the crimping operation. This takes also longer in FIG. 4 than in FIG. 3.

As the comparison of the movement diagrams, in particular those of FIGS. 3 and 4, shows, the individual activation of the individual drives results in a considerable saving of time as compared to the case where all these drives are coupled with each other, for instance via a single shaft or cam plate. For if the drives in the examples underlying FIGS. 3 and 4 were jointly driven by one shaft, not only the crimping and the spreading operation would take more time in FIG. 4 than in FIG. 3, but also the closing tools driven by the same shaft, so that the setting and closing of the closure clips would be delayed unnecessarily.

What is claimed is:

1. A method for producing sausage-like products with a tubular or bag-shaped packaging casing, where the unilaterally closed packaging casing is first of all filled with filling and is subsequently crimped, then there is produced a neck portion of the desired length, which is free from filling, and the neck portion free from filling is finally closed by setting and closing at least one closure clip, wherein the operations of crimping the packaging casing, elongating the neck obtained, and setting and closing of the closure clip are each controlled independently of each other.

2. The method according to claim 1, wherein the operations are controlled by product-specific programs.

3. A closing device for producing sausage-like products with a tubular or bag-shaped packaging casing, comprising means (11, 12, 14) for crimping the packaging casing, means (16) for forming a neck portion free from filling by spreading the crimping means, and means (18, 20, 22, 24) for setting and closing closure clips, wherein the means (11, 12, 14) for crimping the packaging casing, the means (16) for spreading the crimping means, and the means (18, 20, 22, 24) for setting and closing closure dips are controlled independently of each other.

4. The device according to claim 3, wherein the device includes a control unit (28) to which the means (11, 12, 14) for crimping the packaging casing, the means (16) for spreading the crimping means, and the means (18, 20, 22, 24) for setting and closing closure clips are connected.

5. The device according to claim 4, wherein the control unit is programmable.

6. The device according to claim 3, wherein the means (11, 12, 14) for crimping the packaging casing, the means (16) for spreading the crimping means, and the means (18, 20, 22, 24) for setting and closing closure clips have electric motors as driving elements.

7. The device according to claim 6, wherein the electric motors are linear motors.

8. The device according to claim 6, wherein the electric motors are synchronous motors.

9. The device according to claim 3, wherein the means (11, 12, 14) for crimping the packaging casing, the means (16) for spreading the crimping means, and the means (18, 20, 22, 24) for setting and closing closure clips have pneumatic or hydraulic elements as driving elements.

* * * * *